(12) United States Patent
Sekiguchi et al.

(10) Patent No.: US 10,171,796 B2
(45) Date of Patent: Jan. 1, 2019

(54) MOVING BODY SYSTEM

(71) Applicants: Hiroyoshi Sekiguchi, Kanagawa (JP); Eita Watanabe, Kanagawa (JP)

(72) Inventors: Hiroyoshi Sekiguchi, Kanagawa (JP); Eita Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 203 days.

(21) Appl. No.: 14/983,881

(22) Filed: Dec. 30, 2015

(65) Prior Publication Data
US 2016/0205384 A1 Jul. 14, 2016

(30) Foreign Application Priority Data

Jan. 9, 2015 (JP) .................................. 2015-003482
Nov. 20, 2015 (JP) .................................. 2015-227268

(51) Int. Cl.
| | | |
|---|---|---|
| *B60R 11/04* | (2006.01) | |
| *H04N 13/296* | (2018.01) | |
| *H04N 5/232* | (2006.01) | |
| *H04N 13/225* | (2018.01) | |
| *H04N 13/282* | (2018.01) | |
| *G06K 9/00* | (2006.01) | |
| *B60W 30/08* | (2012.01) | |
| *G08G 1/16* | (2006.01) | |
| *H04N 13/239* | (2018.01) | |

(Continued)

(52) U.S. Cl.
CPC ........... *H04N 13/296* (2018.05); *B60R 11/04* (2013.01); *B60W 30/08* (2013.01); *G06K 9/00791* (2013.01); *G08G 1/166* (2013.01); *H04N 5/23216* (2013.01); *H04N 5/23296* (2013.01); *H04N 13/225* (2018.05); *H04N 13/239* (2018.05); *H04N 13/282* (2018.05); *H04N 13/204* (2018.05); *H04N 2013/0081* (2013.01)

(58) Field of Classification Search
CPC ........... H04N 13/0296; H04N 13/0225; H04N 13/0282; H04N 5/23216; H04N 5/23296; B60R 11/04; B60W 30/08; G02B 27/2228; G06K 9/00791; G06K 9/00805; G06T 7/0075; G08G 1/166
See application file for complete search history.

(56) References Cited

U.S. PATENT DOCUMENTS

| | | |
|---|---|---|
| 5,155,683 A | 10/1992 | Rahim |
| 8,164,627 B1 | 4/2012 | Hahn |

(Continued)

FOREIGN PATENT DOCUMENTS

| | | |
|---|---|---|
| DE | 102009001339 A1 | 9/2010 |
| GB | 2486325 | 6/2012 |

(Continued)

OTHER PUBLICATIONS

Jun. 1, 2016 European Search Report in corresponding European Patent Application No. EP 15202587.0.

*Primary Examiner* — Christopher G Findley
(74) *Attorney, Agent, or Firm* — Cooper & Dunham LLP

(57) ABSTRACT

A moving body system includes an imaging device attachable to a moving body, a visual line direction changing mechanism configured to change a visual line direction of the imaging device and a control unit configured to change the visual line direction of the imaging device in accordance with changing of a movement direction of the moving body.

20 Claims, 19 Drawing Sheets

(51) Int. Cl.
   *H04N 13/00*      (2018.01)
   *H04N 13/204*     (2018.01)

(56) References Cited

U.S. PATENT DOCUMENTS

| | | |
|---|---|---|
| 8,493,436 B2 | 7/2013 | Lyon et al. |
| 9,158,305 B2 | 10/2015 | Ohtomo et al. |
| 2005/0237385 A1 | 10/2005 | Kosaka et al. |
| 2007/0129853 A1 | 6/2007 | Greenfeld et al. |
| 2008/0211912 A1 | 9/2008 | Greenfeld et al. |
| 2010/0017046 A1* | 1/2010 | Cheung ............ G01S 7/003 701/2 |
| 2010/0138079 A1* | 6/2010 | Ogren ............ G05D 1/0038 701/2 |
| 2011/0267452 A1* | 11/2011 | Notsu ............ G06K 9/00798 348/116 |
| 2012/0150386 A1 | 6/2012 | Armbrust |
| 2013/0088578 A1 | 4/2013 | Umezawa et al. |
| 2015/0358610 A1 | 12/2015 | Takahashi et al. |

FOREIGN PATENT DOCUMENTS

| | | |
|---|---|---|
| JP | 2004-001736 | 1/2004 |
| JP | 2004-354236 | 12/2004 |
| JP | 3965078 | 8/2007 |
| JP | 2008-009941 | 1/2008 |
| JP | 2013-038622 | 2/2013 |
| JP | 2013-066247 | 4/2013 |
| JP | 2013-093013 | 5/2013 |
| JP | 2014-150496 | 8/2014 |
| WO | WO2010/10009 A1 | 9/2010 |

\* cited by examiner

FIG.5A

| STEERING OPERATION ANGLE H | VISUAL LINE DIRECTION (ANGLE) θ OF STEREO CAMERA |
|---|---|
| H>T | 90 DEGREES |
| T≧H | 0 DEGREES |

FIG.5B

| STEERING OPERATION ANGLE H | VISUAL LINE DIRECTION (ANGLE) θ OF STEREO CAMERA |
|---|---|
| H>T2 | 90 DEGREES |
| T2≧H>T1 | ANGLE DEPENDING ON H |
| T1≧H | 0 DEGREES |

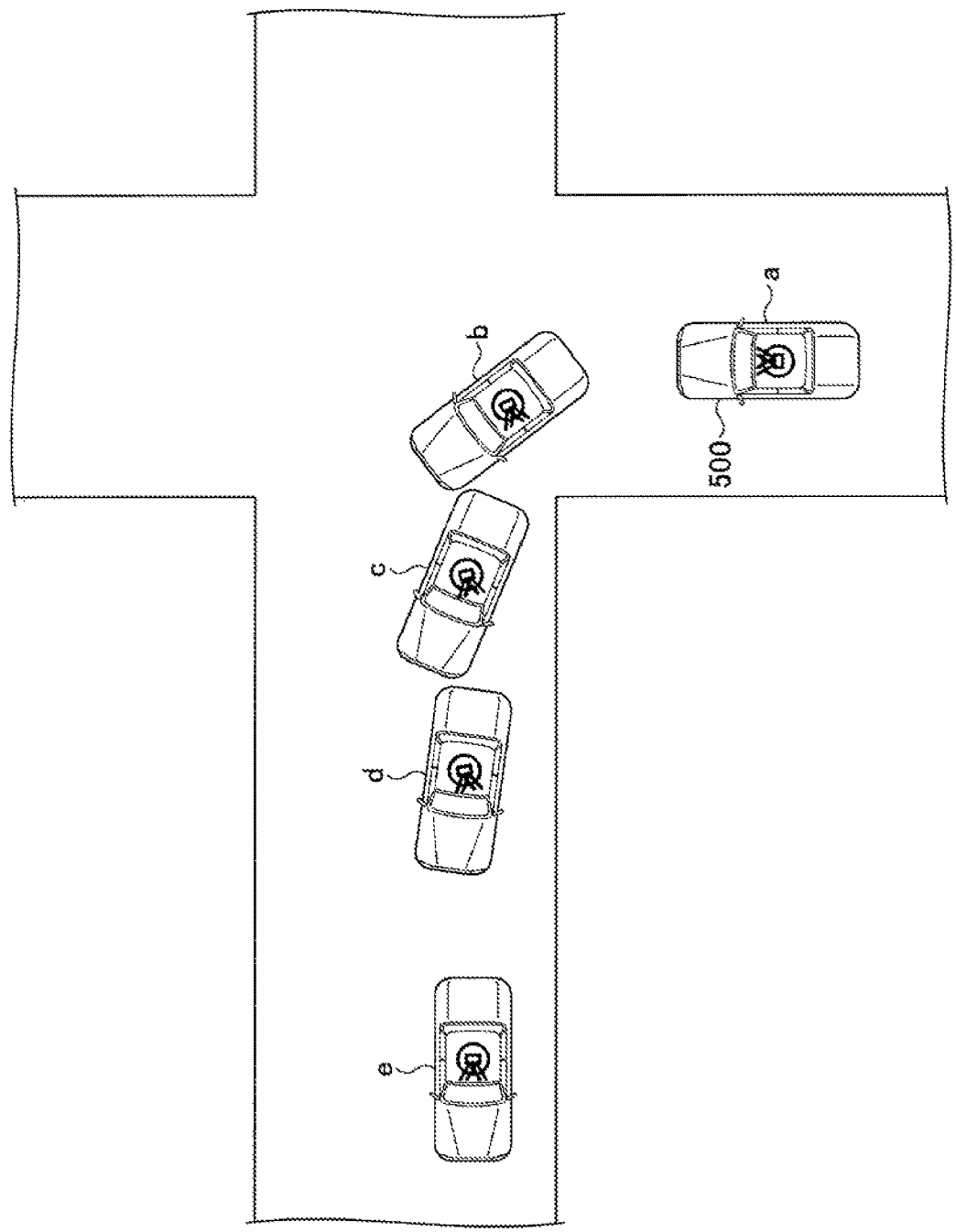

MOVING BODY SYSTEM

BACKGROUND OF THE INVENTION

1. Field of the Invention

The disclosures herein generally relate to a moving body system.

2. Description of the Related Art

A moving body system in which a stereo camera is attached to a moving body for obtaining information of a surrounding area of the moving body known in the art.

Japanese Unexamined Patent Application Publication No. 2013-93013) discloses a configuration in which a plurality of stereo cameras are secured on a vehicle such that each of the stereo cameras captures a view in the same direction or a different direction.

However, in a state in which the stereo camera is secured, time for obtaining the information of the surrounding area of the moving body becomes longer when a movement direction of the moving body is changed to a left direction or a right direction.

SUMMARY OF THE INVENTION

It is a general object of at least one embodiment of the present invention to provide a moving body system that substantially obviates one or more problems caused by the limitations and disadvantages of the related art.

In one embodiment, a moving body system includes an imaging device attachable to a moving body, a visual line direction changing mechanism configured to change a visual line direction of the imaging device and a control unit configured to change the visual line direction of the imaging device in accordance with changing of a movement direction of the moving body.

An embodiment of the present invention also provides a moving body system which includes an imaging device attachable to a moving body, the imaging device being configured to capture a predetermined area with respect to the moving body, the predetermined area being outside of the moving body, a predetermined area changing mechanism configured to move the imaging device with respect to the moving body in order to change the predetermined area with respect to the moving body in a state in which the imaging device is attached to the moving body and a control unit configured to control the changing mechanism in order to change the predetermined area with respect to the moving body in accordance with changing of a movement direction of the moving body.

BRIEF DESCRIPTION OF THE DRAWINGS

FIGS. 5A and 5B are tables illustrating examples of a relation between a steering operation angle H and a visual line direction θ of the stereo camera;

FIGS. 8A and 8B are drawings for describing the relation between the movement direction of the vehicle and the visual line direction of the stereo camera;

DESCRIPTION OF THE PREFERRED EMBODIMENTS

In the following, embodiments of the present invention will be described with reference to the accompanying drawings.

A moving body system according to an embodiment of the present invention includes an imaging device (capturing device) attachable to a moving body, a visual line direction changing mechanism configured to change a visual line direction of the imaging device, and a control unit configured to control the visual line direction of the imaging device in accordance with changing of a movement direction of the moving body.

In the following, the moving body system in which a vehicle is used as an example of the moving body will be described. However, the present invention is not limited to this.

<First Embodiment>

(System Configuration of the Moving Body System)

Figure 1:
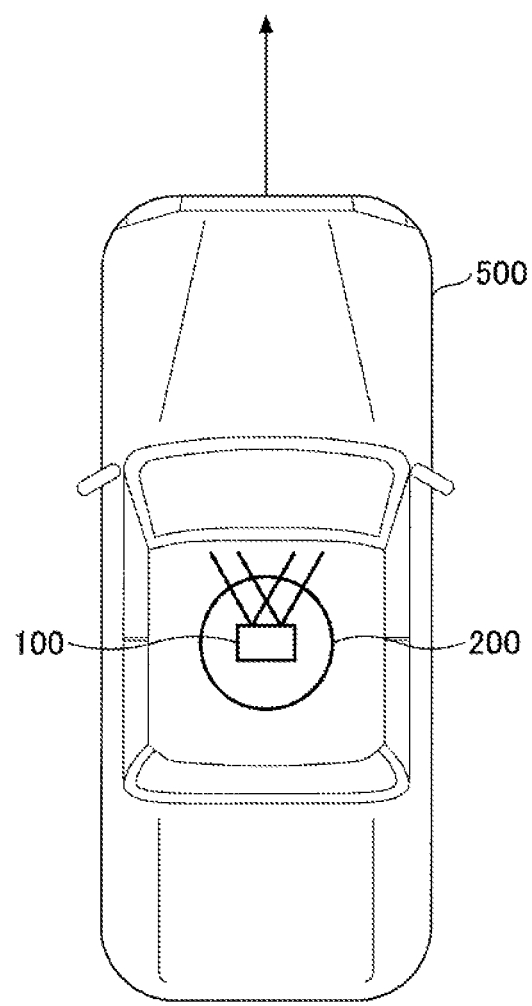
FIG. 1 is a schematic diagram (part 1) illustrating a moving body system according to a first embodiment of the present invention.
Figure 2:
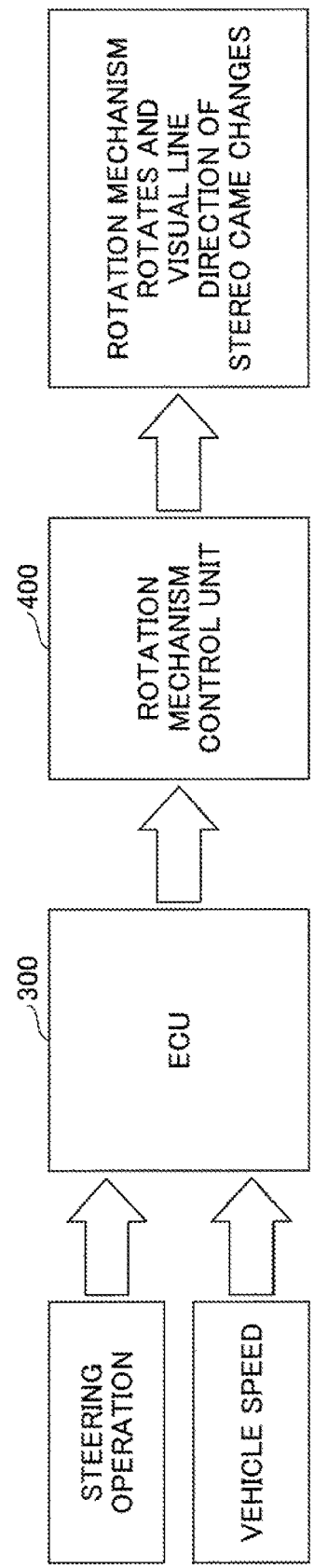
FIG. 2 is a control block diagram of the moving body system according to the first embodiment of the present invention.

In the following, the moving body system according to the first embodiment of the present invention will be described. FIG. 1 is a schematic diagram (part 1) illustrating the moving body system according to the first embodiment of the present invention. FIG. 2 is a diagram illustrating a control block diagram of the moving body system according to the first embodiment of the present invention. It should be noted that the arrow shown in FIG. 1 indicates a movement direction of the vehicle.

As shown in FIG. 1 and FIG. 2, the moving body system includes a stereo camera 100, an electronic control unit (ECU) 300, and a rotation mechanism control unit 400.

The stereo camera 100 is an example of the imaging device (capturing device). The stereo camera 100 includes two or more cameras whose points of view are different from each other and obtains information of a surrounding area of a vehicle 500 using these cameras which capture (image) a capture target such as a person and an object. Specifically, the stereo camera 100 may measure a distance between the vehicle 500 and the person or the object approaching the vehicle 500 from the surrounding area of the vehicle 500, for example. In other words, the stereo camera 100 may capture an outside area (predetermined area) of the vehicle 500. The stereo camera 100 may be attached (attachable) on a roof part of the vehicle 500 via the rotation mechanism 200 for example, and rotate together with the rotation mechanism 200 when the rotation mechanism 200 rotates.

It should be noted that the stereo camera 100 is used as an example of the imaging device in FIG. 1. However the present invention is not limited to this. A monocular camera may be used instead of the stereo camera 100. Some embodiments may include a plurality of monocular cameras arranged for enlarging an angle of view and monitoring the distance to the person and the object. Further, some other embodiments may monitor the distance to the person and the object by using a phase shift method.

Further, although the stereo camera 100 is attached on the roof part of the vehicle 500 in FIG. 1, the present invention is not limited to this. For example, the stereo camera 100 may be attached on a hood (bonnet) of the vehicle 500.

Figure 3:
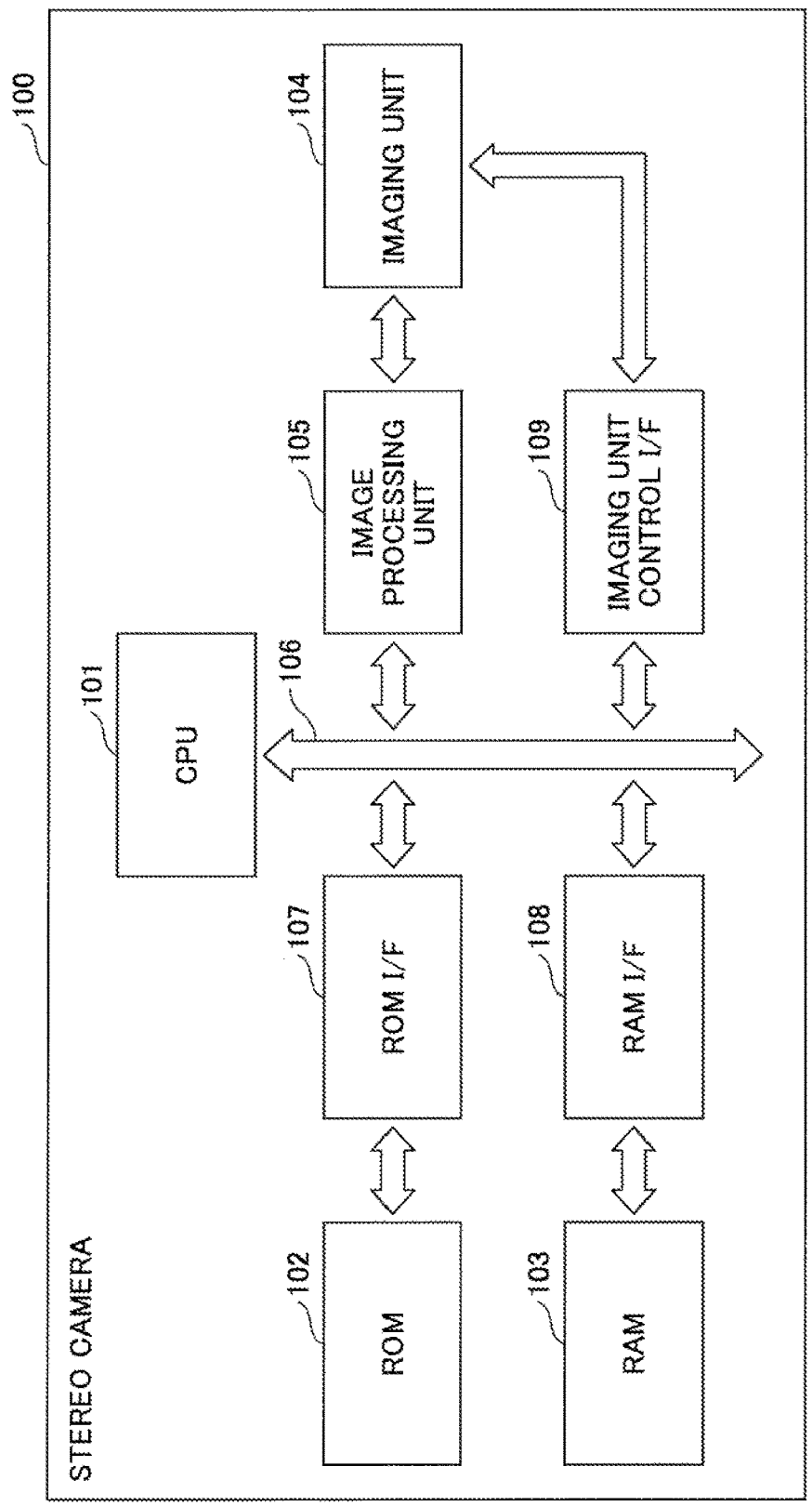
FIG. 3 is a block diagram illustrating the hardware configuration of a stereo camera according to the first embodiment of the present invention.

A hardware configuration of the stereo camera 100 will be described. FIG. 3 is a block diagram illustrating the hardware configuration of the stereo camera 100 according to the first embodiment of the present invention.

As shown in FIG. 3, the stereo camera 100 includes a central processing unit (CPU) 101, a read only memory (ROM) 102, a random access memory (RAM) 103, an imaging unit 104, and an image processing unit 105. It should be noted these units of the stereo camera 100 are connected each other via a bus 106.

The CPU 101 controls the stereo camera 100 by executing programs stored in the ROM 102. The RAM 103 functions as a work space in which the programs stored in the ROM 102 are held when being executed by the CPU 101.

The ROM 102 is a nonvolatile memory. The ROM 102 is connected to the bus 106 via a ROM interface (I/F) 107. The ROM 102 stores programs, data and the like which are executed by the CPU 101.

The RAM 103 is a main storage device such as a dynamic random access memory (DRAM) and a static random access memory (SRAM). The RAM 103 is connected to the bus 106 via a RAM interface (I/F) 108. The RAM 103 functions as a work space for various programs being executed by the CPU 101.

The imaging unit 104 is a camera which captures the object and is connected to the image processing unit 105. An image (luminance image) captured by the imaging unit 104 is processed (image processed) by the image processing unit 105 as appropriate. Further, the imaging unit 104 is connected to the bus 106 via an imaging unit control interface (I/F) 109.

The image processing unit 105 calculates a parallax (disparity) based on the luminance image of the object which is captured by the imaging unit 104. The image processing unit 105 calculates the distance from the stereo camera 100 to the person or the object based on the calculated parallax, and generates a parallax image. Further, the image processing unit 105 recognizes the person and the object based on the generated parallax image and the luminance image. A method for calculating (may be referred to as "measuring distance" hereinafter) the distance to the person or the object will be described later. Is should be noted that the parallax may be described as an example of distance information since the parallax is a function (mathematical scheme) of the distance.

The rotation mechanism 200 is an example of the visual line direction changing mechanism (predetermined area changing mechanism). The rotation mechanism 200 is a mechanism which can change the visual line direction of the stereo camera 100 freely. Further, the rotation mechanism 200 can move the stereo camera 100 relative to the vehicle 500 in order to change the visual line direction (the predetermined area) with respect to the vehicle 500 in a state in which the stereo camera 100 is attached to the vehicle 500. It should be noted that although the rotation mechanism 200 is used for the example of the visual line direction changing mechanism, the present invention is not limited to this as long as the mechanism can change the visual line direction of the stereo camera 100 freely.

The ECU 300 is an example of the control unit. The ECU 300 controls the visual line direction of the stereo camera 100 based on information which indicates the movement direction of the vehicle 500. As a result, the ECU 300 controls the visual line direction of the stereo camera 100 in accordance with changing of the movement direction of the vehicle 500. It should be noted that information relating to a steering operation of the vehicle 500 such as a steering operation angle of the steering of the vehicle 500, a steering operation speed of the vehicle 500 and an angle of inclination of a wheel is used for the information which indicates the movement direction of the vehicle 500. In other words, the ECU 300 changes the visual line direction of the stereo camera 100 based on at least one of information of the steering operation angle of the moving body, information of the steering operation speed of the moving body, and information of the angle of inclination of the wheel of the moving body. Specifically, the ECU 300, for example, may obtain (detect) the steering operation angle of the vehicle 500 in order to control the visual line direction of the stereo camera 100 based on the changing of the steering operation angle of the vehicle 500 which is obtained. In other words, the ECU 300 controls the rotation mechanism 200 in order to change the visual line direction (the predetermined area) with respect to the vehicle 500 in accordance with an operation of a movement direction changing mechanism such as the steering which changes the movement direction of the vehicle 500. The ECU 300 may be communicatively connected to another ECU or the like which is mounted on the rotation mechanism control unit 400, the vehicle 500, or the like via an in-vehicle network such as a controller area network (CAN) and a local interconnect network (LIN).

The rotation mechanism control unit 400 is connected to the in-vehicle network. The rotation mechanism control unit 400 can communicate with the ECU 300, for example. The rotation mechanism control unit 400 controls a movement of the rotation mechanism 200 such that an rotation angle of the rotation mechanism 200 becomes a specified angle specified by the ECU 300.

(Movement of the Moving Body System)

An example of the movement of the moving body system will be described.

As shown in FIG. 2, the ECU 300 determines the rotation angle of the rotation mechanism 200 with respect to the rotation mechanism control unit 400 based on the information which indicates the movement direction of the vehicle 500. The ECU 300 controls the movement of the rotation mechanism 200 via the rotation mechanism control unit 400. When the rotation mechanism 200 rotates, the visual line direction of the stereo camera 100 is changed since the stereo camera 100, which is attached on the rotation mechanism 200, rotates together with the rotation mechanism 200. In this way, time for obtaining the information of the surrounding area of the vehicle 500 can be reduced. As a result, a collision between the vehicle 500 and the person or the object may be prevented.

It is preferable that the ECU 300 determines the rotation angle of the rotation mechanism 200 in order to change an angle made by the visual line direction of the stereo camera 100 and the movement direction of the vehicle 500 based on a changing amount of the movement direction of the vehicle 500. In particular, it is preferable that the ECU 300 determines the rotation angle of the rotation mechanism 200 such that the larger the changing amount of the movement direction of the vehicle 500 is, the larger the angle made by the visual line direction of the stereo camera 100 and the movement direction of the vehicle 500 is. In this way, the information of the surrounding area of the vehicle 500 may be obtained promptly even if a driver of the vehicle 500 changes the movement direction of the vehicle 500 significantly in a short time.

It is preferable that the ECU 300 determines the rotation angle of the rotation mechanism 200 such that the stereo camera 100 is angled with respect to the movement direction of the vehicle 500 inside of (further in) a turning direction of the vehicle 500. Thus, the object which exists outside of a field of view of the driver may be captured and recognized promptly in particular since the stereo camera 100 is turned (angled) additionally to the inside direction with respect to the movement direction of the vehicle 500.

It is preferable that the ECU 300 uses information of a speed of the vehicle 500 as the information used for changing the visual line direction of the stereo camera 100 in addition to the information which indicates the movement direction of the vehicle 500. Specifically, it is preferable that the ECU 300 determines the rotation angle of the rotation mechanism 200 such that the rotation angle of the rotation mechanism 200, in a case in which the speed of the vehicle 500 is fast, is larger (greater) than the rotation angle of the rotation mechanism 200 in a case in which the speed of the vehicle 500 is slow. In this way, an angle amount which is angled additionally with respect to the movement direction of the vehicle 500 in the case in which the speed of the vehicle 500 is fast may be enlarged. Further, the angle amount which is angled additionally with respect to the movement direction of the vehicle 500 in the case in which the speed of the vehicle 500 is slow may be minified (reduced).

Figure 4:
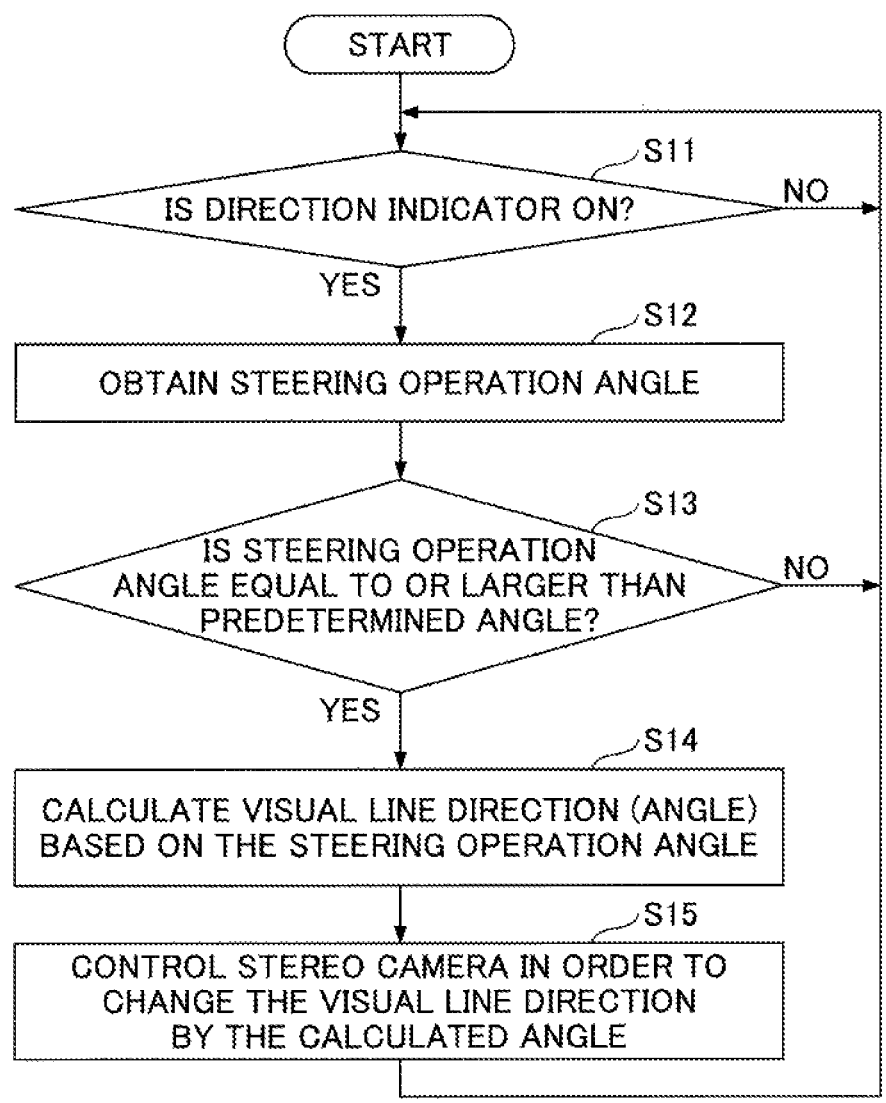
FIG. 4 is a flowchart illustrating an example of an operation of the moving body system according to the first embodiment of the present invention.

Next, an example of control performed by the ECU 300 will be described. FIG. 4 is a flowchart illustrating an example of an operation of the moving body system according to the first embodiment of the present invention.

As shown in FIG. 4, the ECU 300 determines whether a direction indicator (blinker) is turned on (blinking) at first in step S11.

In a case in which the ECU 300 determines that the direction indicator is turned on in step S11, the ECU 300 obtains the steering operation angle of the vehicle 500 in step S12. In a case in which the ECU 300 determines that the direction indicator is not turned on in step S11, the process returns to step S11 and repeats step S11.

The ECU 300 obtains the steering operation angle of the vehicle 500 in step S12. Subsequently, the ECU 300 determines whether the steering operation angle obtained in step S12 is equal to or larger than a predetermined angle in step S13.

In a case in which the ECU 300 determines that the steering operation angle is equal to or larger than the predetermined angle in step S13, the ECU 300 calculates the visual line direction (angle) of the stereo camera 100 as a control value based on following formula 1 in step S14.

$$\theta = A \times H \quad \text{[FORMULA 1]}$$

In formula 1, θ (theta) indicates the visual line direction of the stereo camera 100, H indicates the steering operation angle of the vehicle 500, and A indicates a constant number relating to a vehicle type, a mounted position of a camera, an angle of view of the camera, and the like. In a case in which the ECU 300 determines that the steering operation angle is smaller (less) than the predetermined angle in step S13, the process returns to step S11.

Subsequently, using the control value calculated in step S14, the ECU 300 controls the stereo camera 100 in order to change the visual line direction of the stereo camera 100 by the calculated angle in step S15. After that, the process returns to step S11.

It should be noted that although the ECU 300 obtains the steering operation angle of the vehicle 500 in the case in which it is determined that the direction indicator is turned on as shown in FIG. 4, the ECU 300 may obtain the steering operation angle of the vehicle 500 without determining whether the direction indicator is turned on. However, it is preferable to determine whether the direction indicator is turned on, since to determine whether the direction indicator is turned on may prevent the visual line direction θ of the stereo camera 100 from being changed frequently when the vehicle 500 changes a driving lane or the like.

In formula 1, the visual line direction θ of the stereo camera 100 is a linear function of the steering operation angle H, however, the present invention is not limited to this. For example, the visual line direction θ of the stereo camera 100 may be a high-order function of the steering operation angle H such as a quadratic function and a cubic function.

Further, the ECU 300 may control the stereo camera 100 based on a table which indicates a relation between the steering operation angle H which is predetermined in accordance with the vehicle type, the mounted position of the camera, the angle of view of the camera, and the like and the visual line direction θ of the stereo camera 100. FIGS. 5A and 5B are tables illustrating examples of the relation between the steering operation angle H and the visual line direction θ of the stereo camera 100.

In the table shown in FIG. 5A, the visual line direction θ of the stereo camera 100 is controlled (caused) to be 0 degrees in a case in which the steering operation angle H is equal to or less than a predetermined threshold T. Further, in the table shown in FIG. 5A, the visual line direction θ of the stereo camera 100 is controlled (caused) to 90 degrees in a case in which the steering operation angle H is larger (greater) than the predetermined threshold T.

In the table shown in FIG. 5B, the visual line direction θ of the stereo camera 100 is controlled (caused) to be 0 degrees in a case in which the steering operation angle H is equal to or less than a first threshold T1. Further, in the table shown in FIG. 5B, the visual line direction θ of the stereo camera 100 is controlled (caused) to an angle which depends on the steering operation angle H in a case in which the steering operation angle H is larger than the first threshold T1 and equal to or less than a second threshold T2. Further, in the table shown in FIG. 5B, the visual line direction θ of the stereo camera 100 is controlled (caused) to be 90 degrees in a case in which the steering operation angle H is larger than the second threshold T2. It should be noted that the angle which depends on the steering operation angle H may be an angle which can be calculated by a linear expression or a quadratic, for example. In other words, in accordance with the changing of the movement direction of the vehicle 500 by a first angle to one side, the ECU 300 can control the rotation mechanism 200 in order to change the visual line direction (the predetermined area) with respect to the vehicle 500 by a second angle which is larger than the first angle to the one side. Further, in a case in which the changing angle of the movement direction of the vehicle 500 is less than the first angle, the ECU 300 can control the rotation mechanism 200 in order not to change the visual line direction (the predetermined area) with respect to the vehicle 500. In other words, in the case in which the changing angle of the movement direction of the vehicle 500 is less than the first angle, the ECU 300 does not rotate the stereo camera 100.

Figure 6:
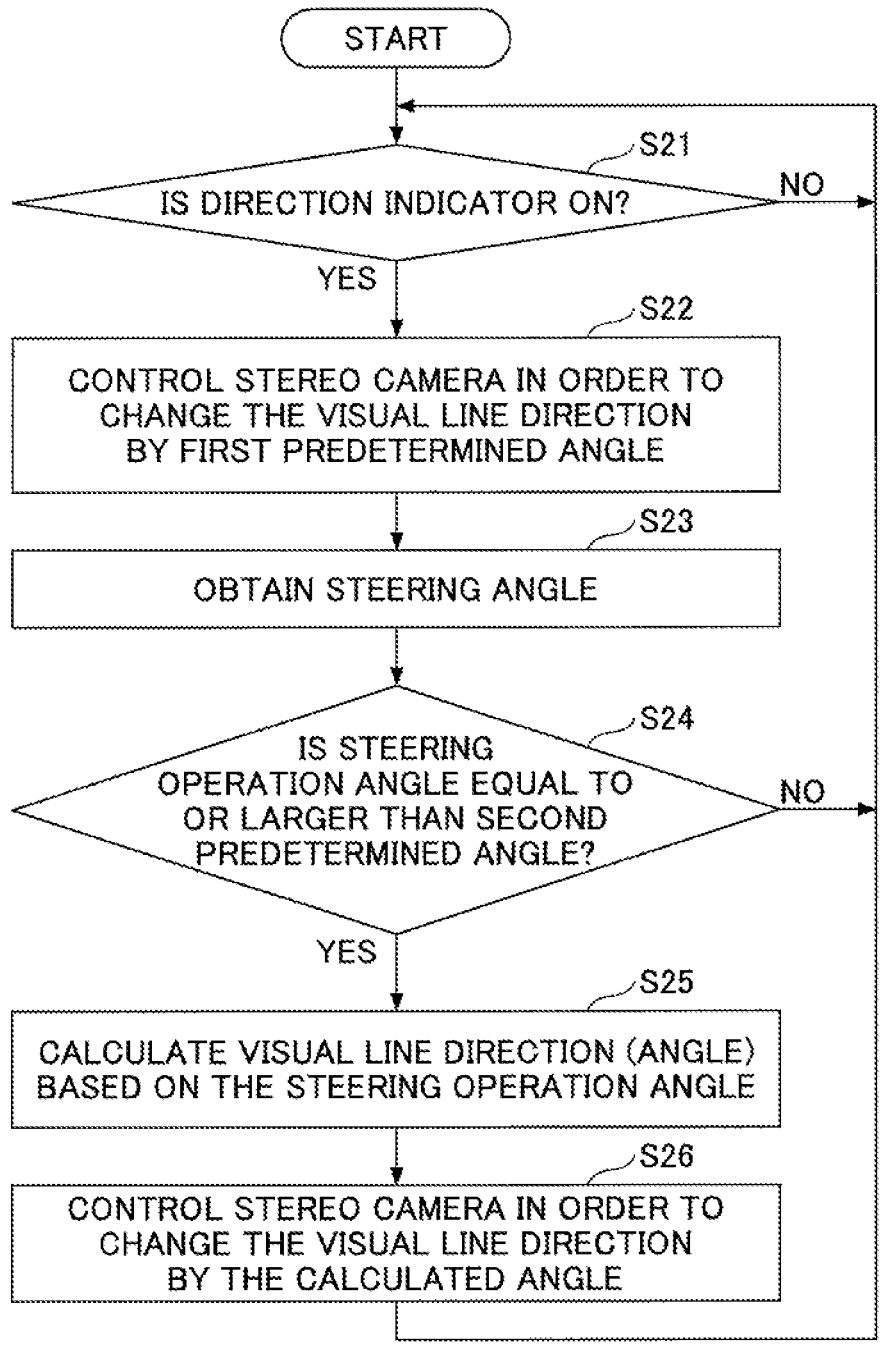
FIG. 6 is a flowchart illustrating another example of an operation of the moving body system according to the first embodiment of the present invention.

Next, another example of control performed by the ECU 300 will be described. FIG. 6 is a flowchart illustrating another example of the operation of the moving body system according to the first embodiment of the present invention.

As shown in FIG. 6, the ECU 300 determines whether a direction indicator is turned on at first in step S21.

In a case in which the ECU 300 determines that the direction indicator is turned on in step S21, the ECU 300 controls the stereo camera 100 such that the visual line direction of the stereo camera 100 changes by a first predetermined angle in a direction corresponding to the direction indicator in step S22. For example, in a case in which the direction indicator indicates a left direction, the ECU 300 controls the stereo camera 100 such that the visual line direction of the stereo camera 100 changes by the first predetermined angle in the left direction. In a case in which the ECU 300 determines that the direction indicator is not turned on in step S21, the process returns to step S21 and repeats step S21.

Subsequently, the ECU 300 obtains the steering operation angle of the vehicle 500 in step S23.

Subsequently, the ECU 300 determines whether the steering operation angle obtained in step S23 is equal to or larger (greater) than a second predetermined angle in step S24.

In a case in which the ECU 300 determines that the steering operation angle is equal to or larger than the second predetermined angle in step S24, the ECU 300 calculates the visual line direction of the stereo camera 100 as a control value based on following formula 2 in step S25.

$$\theta = A \times H + W \quad \text{[FORMULA 2]}$$

In formula 2, θ indicates the visual line direction of the stereo camera 100, H indicates the steering operation angle of the vehicle 500, A indicates a constant number relating to a vehicle type, a mounted position of a camera, an angle of view of the camera, and the like, and W indicates an angle of the stereo camera 100 by which the stereo camera 100 is changed when the direction indicator is turned on. In a case in which the ECU 300 determines that the steering operation angle is smaller than the second predetermined angle in step S24, the process returns to step S21.

Subsequently, using the control value calculated in step S25, the ECU 300 controls the stereo camera 100 in order to change the visual line direction of the stereo camera 100 by the calculated angle in step S26. After that, the process returns to step S21.

In FIG. 6, the visual line direction of the stereo camera 100 is caused to turn to the direction corresponding to the direction indicator upon occurrence of an event in which the driver turns on the direction indicator. Accordingly, an accident involving the person, the object, and the like may be prevented in particular, since information which indicates a schedule of the movement direction of the vehicle 500 in which the vehicle 500 moves can be obtained before the driver operates the steering (handle).

In formula 2, the visual line direction θ of the stereo camera 100 is a linear function of the steering operation angle H, however, the present invention is not limited to this. For example, the visual line direction θ of the stereo camera 100 may be a quadratic function or a cubic function of the steering operation angle H.

Similar to the process shown in FIG. 4, the ECU 300 may control the stereo camera 100 based on the table which indicates the relation between the steering operation angle H which is predetermined in accordance with the vehicle type, the mounted position of the camera, the angle of view of the camera, and the like and the visual line direction θ of the stereo camera 100.

In the following, an example of specific control of the ECU 300 in a case in which the vehicle 500 whose movement direction has been a front direction (forward) turns to the left direction will be described.

Figure 7:
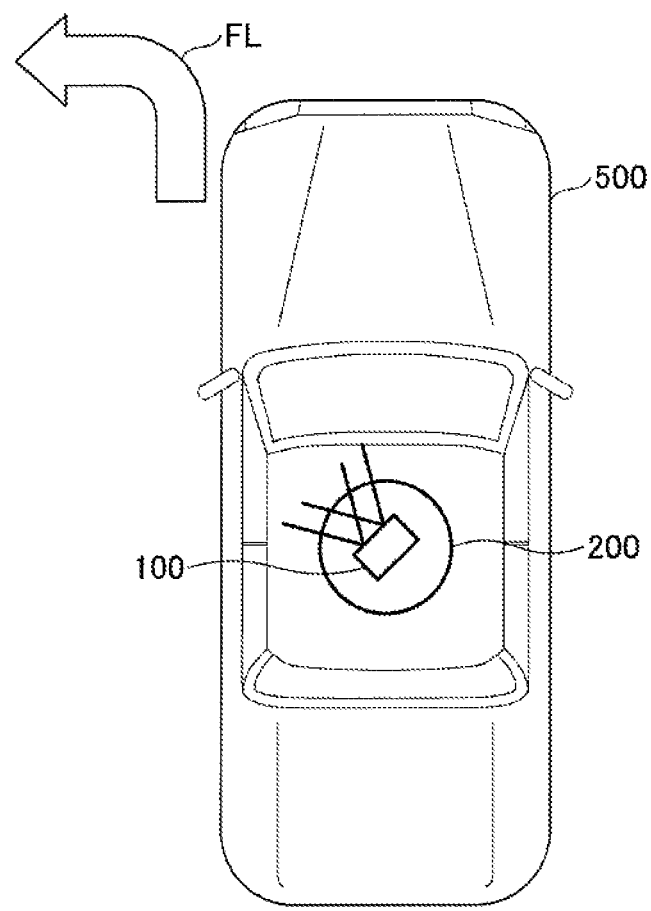
FIG. 7 is a diagram illustrating a movement of the moving body system in a case in which the steering of the vehicle whose movement direction has been a front direction is operated to turn to a left direction.

FIG. 7 is a diagram illustrating the movement of the moving body system in the case in which the steering of the vehicle 500 whose movement direction has been the front direction is operated to turn to the left direction. In the case in which the vehicle 500 whose movement direction has been the front direction turns to the left direction ("arrow FL" shown in FIG. 7), the ECU 300 controls the visual line direction of the stereo camera 100 in accordance with the changing of the movement direction of the vehicle 500.

In the following, the relation between the movement direction of the vehicle 500 and the visual line direction of the stereo camera 100 at each point when the movement direction of the vehicle 500 turns from the front direction to the left direction will be described.

Figure 8B:
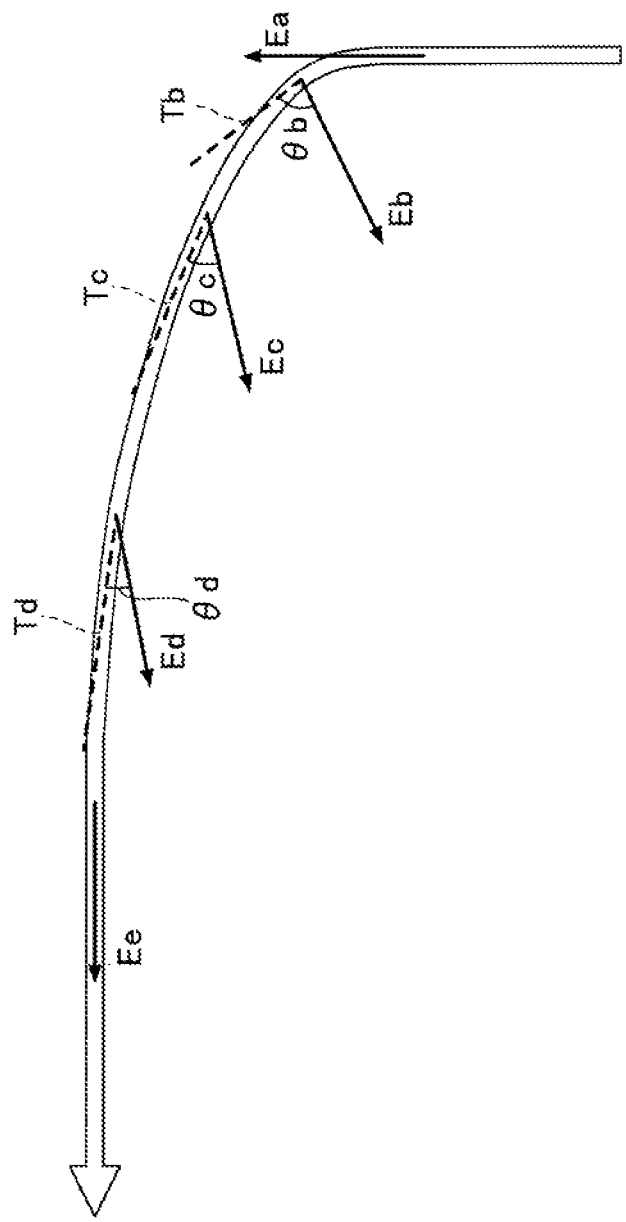

FIGS. 8A and 8B are drawings for describing the relation between the movement direction of the vehicle 500 and the visual line direction of the stereo camera 100. FIG. 8A shows a trajectory of the vehicle 500 which turns to the left and points a, b, c, d, and e in the trajectory. FIG. 8B shows the visual line direction of the stereo camera 100 at each of the points a, b, c, d, and e shown in FIG. 8A. In FIG. 8B, a void arrow shows the trajectory of the vehicle 500. Further, in FIG. 8B, solid arrows Ea, Eb, Ec, Ed, and Ee show the visual line directions of the stereo camera 100 at the points a, b, c, d, and e respectively. In FIG. 8B, dash lines Tb, Tc, and Td show tangential lines of the vehicle 500 at the points b, c, and d respectively.

At the point a, the driver has turned on the direction indicator, however, the driver does not operate (turn) the steering. Thus, the vehicle 500 is moving (traveling) in the front direction. At that time, since the movement direction of the vehicle 500 does not change, the ECU 300 obtains information which indicates that the steering operation angle H is 0 degrees and the steering of the vehicle 500 is not turned, and calculates the visual line direction θ of the stereo camera 100 according to formula 1. Further, the ECU 300 controls the rotation mechanism 200 via the rotation mechanism control unit 400 in order to maintain a state in which the visual line direction of the stereo camera 100 and the movement direction of the vehicle 500 are equal (see "arrow Ea" in FIG. 8B). In this way, the visual line direction of the stereo camera 100 becomes a direction of the arrow Ea.

At the point b, the driver is rotating the steering in a counterclockwise direction (turning to the left). Thus, the vehicle 500 is turning to the left direction (see "arrow Tb" shown in FIG. 8B). At that time, the ECU 300 obtains information which indicates that the steering operation angle H is h1 and the steering of the vehicle 500 is turned to left, and calculates the visual line direction θ of the stereo camera 100 according to formula 1. Further, the ECU 300 controls the rotation mechanism 200 via the rotation mechanism control unit 400 in order to turn (angle) the visual line direction of the stereo camera 100 with respect to the movement direction of the vehicle 500 inside of the turning direction of the vehicle 500. That is, an angle θb shown in FIG. 8B is made by the movement direction Tb of the vehicle 500 at the point b and the visual line direction Eb of the stereo camera 100 at the point b. In this way, the visual line direction of the stereo camera 100 becomes a direction of the arrow Eb.

At the point c, the driver is gradually returning the steering, which has been turned to the left, to its original state. Thus, the vehicle 500 is turning to the left (see "arrow Tc" shown in FIG. 8B). At that time, the ECU 300 obtains information which indicates the steering operation angle H is h2 (h2<h1) and the steering of the vehicle 500 is turned to the left, and calculates the visual line direction θ of the stereo camera 100 according to formula 1. Further, the ECU 300 controls the rotation mechanism 200 via the rotation mechanism control unit 400 in order to turn (angle) the visual line direction of the stereo camera 100 with respect to the movement direction of the vehicle 500 inside of the turning direction of the vehicle 500. That is, an angle θc shown in FIG. 8B is made by the movement direction Tc of the vehicle 500 at the point c and the visual line direction Ec of the stereo camera 100 at the point c. In this way, the visual line direction of the stereo camera 100 becomes a direction of the arrow Ec.

At the point d, the driver is further returning the steering, which has been turned to the left, to its original state from the steering at the point c, and the steering is approximately straight. Thus, the vehicle 500 is turning to the left (see "arrow Td" shown in FIG. 8B). At that time, the ECU 300 obtains information which indicates the steering operation angle H is h3 (h3<h2) and the steering of the vehicle 500 is turned to the left, and calculates the visual line direction θ of the stereo camera 100 according to formula 1. Further, the ECU 300 controls the rotation mechanism 200 via the rotation mechanism control unit 400 in order to turn (angle) the visual line direction of the stereo camera 100 with respect to the movement direction of the vehicle 500 inside of the turning direction of the vehicle 500. That is, an angle θd shown in FIG. 8B is made by the movement direction Td of the vehicle 500 at the point d and the visual line direction Ed of the stereo camera 100 at the point d. In this way, the visual line direction of the stereo camera 100 becomes a direction of the arrow Ed.

At the point e, the driver returns the steering, which has been turned to the left, to its original state (straight). The vehicle 500 is going straight in the left direction. At that time, since the movement direction of the vehicle 500 does not change, the ECU 300 obtains information which indicates that the steering operation angle H is 0 degrees and the steering of the vehicle 500 is not turned, and calculates the visual line direction θ of the stereo camera 100 according to formula 1. Further, the ECU 300 controls the rotation mechanism 200 via the rotation mechanism control unit 400 in order to maintain a state in which the visual line direction of the stereo camera 100 and the movement direction of the vehicle 500 are equal (see "arrow Ee" in FIG. 8B). In this way, the visual line direction of the stereo camera 100 becomes a direction of the arrow Ee.

As described above, the ECU 300 obtains the steering operation angle of the vehicle 500 in order to control the visual line direction of the stereo camera 100 based on the changing of the steering operation angle of the vehicle 500 which is obtained. That is, the ECU 300 controls the visual line direction of the stereo camera 100 in accordance with the changing of the movement direction of the vehicle 500. Thus, the time for obtaining the information of the surrounding area of the vehicle 500 may be reduced.

It should be noted that although the steering operation angle of the vehicle 500 is used in the above described embodiment, the present invention is not limited to this. Information of a steering operation speed, an angle of inclination of a wheel or the like may be used.

Figure 9:
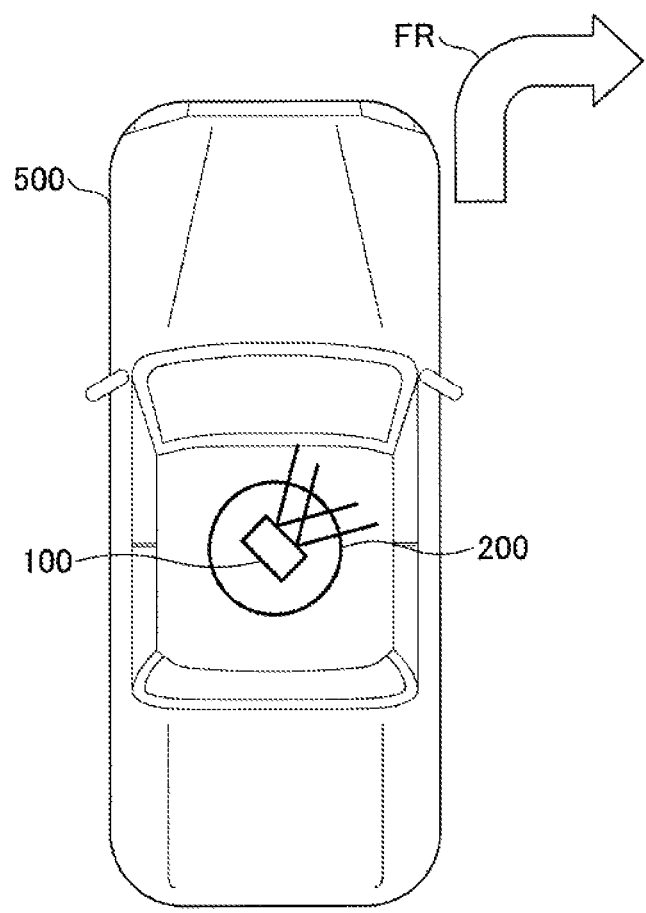
FIG. 9 is a diagram illustrating the movement of the moving body system in a case in which the steering of the vehicle whose movement direction has been a front direction is operated to turn to a right direction.
Figure 10:
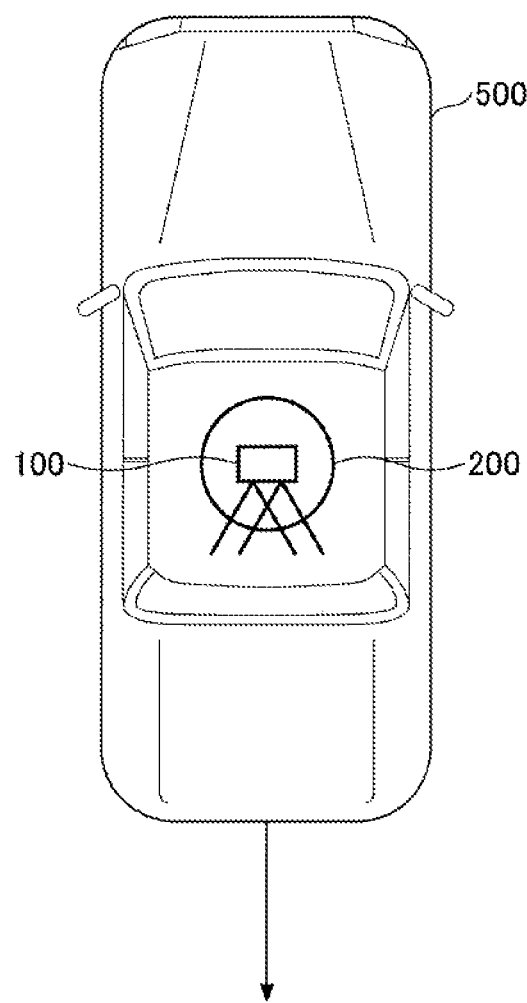
FIG. 10 is a schematic diagram (part 2) illustrating the moving body system according to the first embodiment of the present invention.
Figure 11:
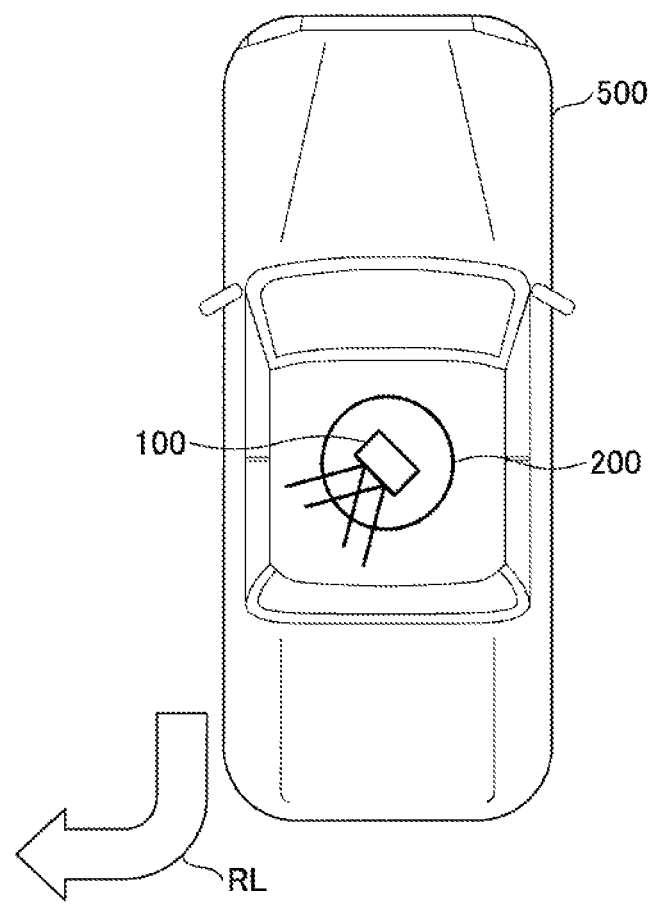
FIG. 11 is a diagram illustrating the movement of the moving body system in a case in which the steering of the vehicle whose movement direction has been a rear direction is operated to turn to the left direction.
Figure 12:
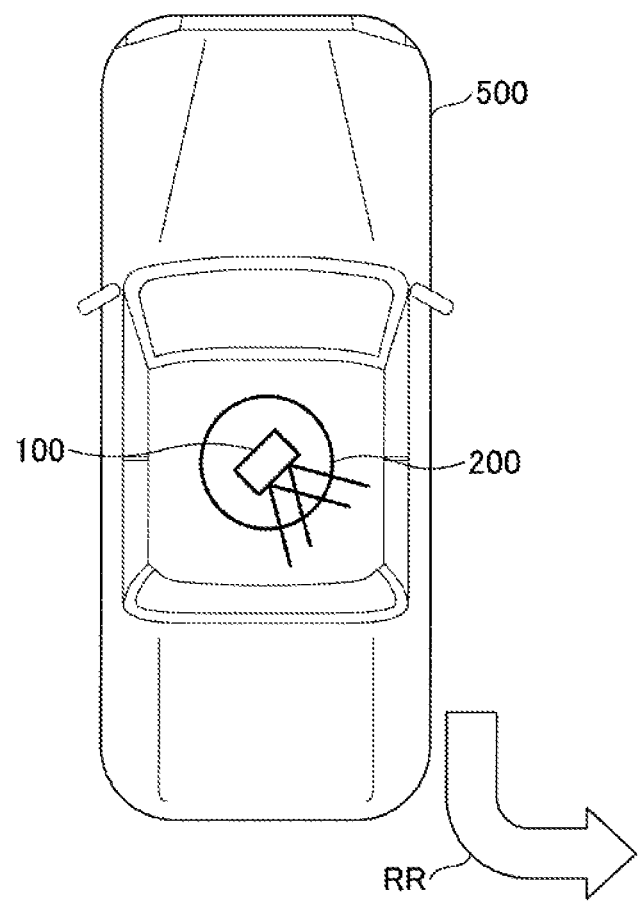
FIG. 12 is a diagram illustrating the movement of the moving body system in a case in which the steering of the vehicle whose movement direction has been the rear direction is operated to turn to the right direction.

It is preferable that as shown in FIG. 9, the ECU 300 performs control similar to the control shown in FIG. 7 and FIG. 8 in a case in which the vehicle 500 whose movement direction has been the front direction turns to the right direction ("arrow FR" shown in FIG. 9). FIG. 9 is a diagram illustrating the movement of the moving body system in a case in which the steering of the vehicle 500 whose movement direction has been the front direction is operated to turn to the right direction Next, an example in which the movement direction of the vehicle 500 is a rear direction will be described. FIG. 10 is a schematic diagram (part 2) illustrating the moving body system according to the first embodiment of the present invention. FIG. 11 is a diagram illustrating the movement of the moving body system in a case in which the steering of the vehicle 500 whose movement direction has been the rear direction is operated to turn to the left direction. FIG. 12 is a diagram illustrating the movement of the moving body system in a case in which the steering of the vehicle 500 whose movement direction has been the rear direction is operated to turn to the right direction. It should be noted that the arrow shown in FIG. 10 indicates the movement direction of the vehicle 500.

As shown in FIG. 11, the ECU 300 controls the visual line direction of the stereo camera 100 in accordance with the changing of the movement direction of the vehicle 500 in a case in which the vehicle 500 whose movement direction has been the rear direction turns to the left direction ("arrow RL" shown in FIG. 10). Thus, the time for obtaining the information of the surrounding area of the vehicle 500 can be reduced.

Further, as shown in FIG. 12, it is preferable that the ECU 300 performs control similar to the control of FIG. 11 in a case in which the vehicle 500 whose movement direction has been the rear direction turns to the right ("arrow RR" shown in FIG. 12).

As described above, the moving body system according to the first embodiment of the present invention includes the stereo camera 100 attached to the vehicle 500, the rotation mechanism 200 configured to change the visual line direction of the stereo camera 100, and the ECU 300 configured to control the visual direction of the stereo camera 100 in accordance with the movement direction of the vehicle 500. Thus, the time for obtaining the information of the surrounding area of the vehicle 500 can be reduced. As a result, a collision accident involving a person or a bike when the vehicle 500 turns to left may be prevented. It should be noted that the ECU 300 may output warning information in response to an event in which the stereo camera 100 detects that a distance between the vehicle 500 and the person or the object is less than a predetermined distance. The output information may be used for motion control of the vehicle 500.

<Second Embodiment>

In the following, the moving body system according to the second embodiment of the present invention will be described.

The moving body system according to the second embodiment of the present invention differs from the moving body system according to the first embodiment of the present invention in that the ECU 300 changes at least one of a frame rate and a recognition process rate of a stereo camera 110 in accordance with the changing of the movement direction of the vehicle 500. In the following, features of the second embodiment differing from the features of the first embodiment will be described mainly.

Figure 13:
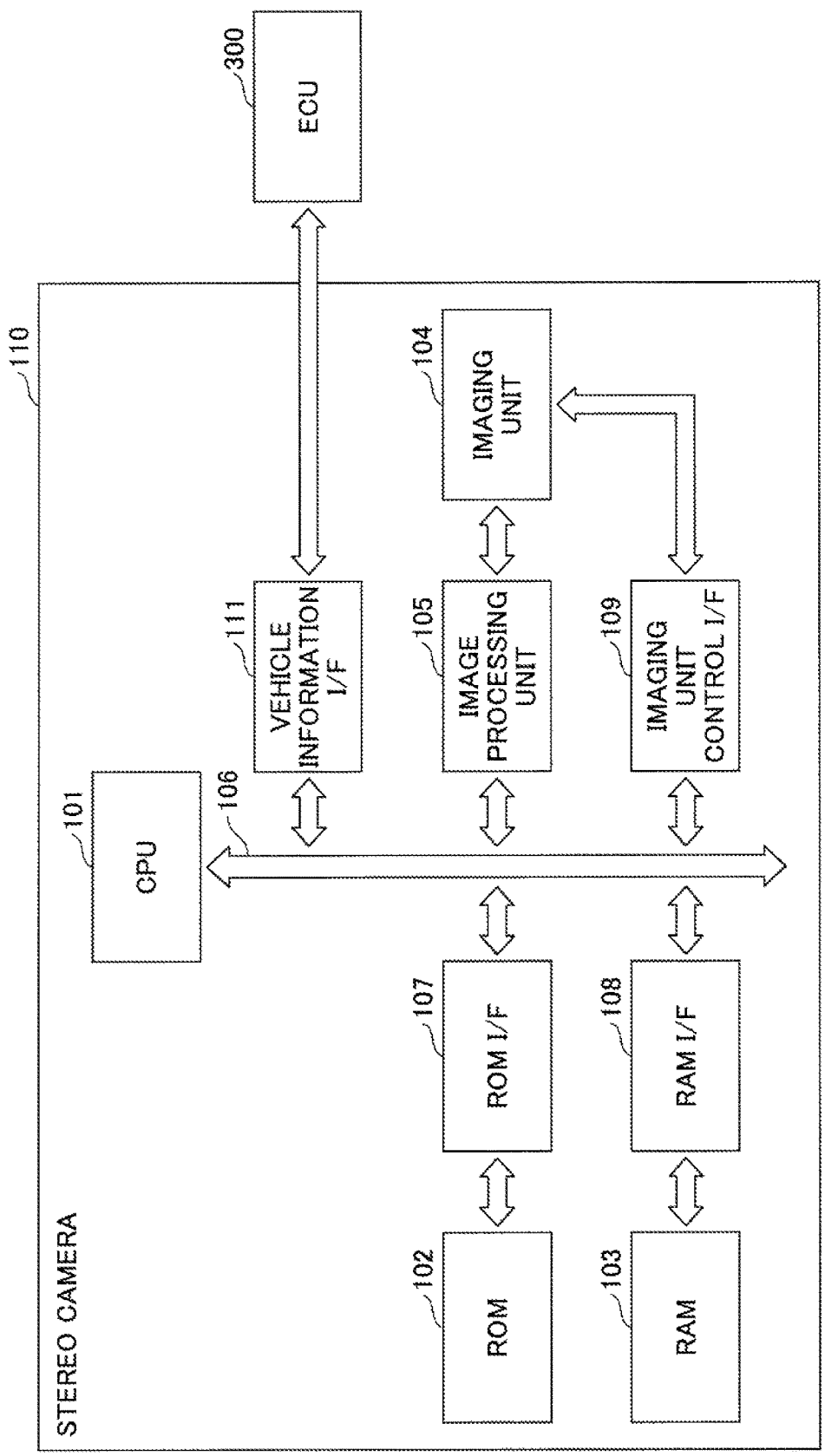
FIG. 13 is a block diagram illustrating the hardware configuration of the stereo camera according to a second embodiment of the present invention.
Figure 14:
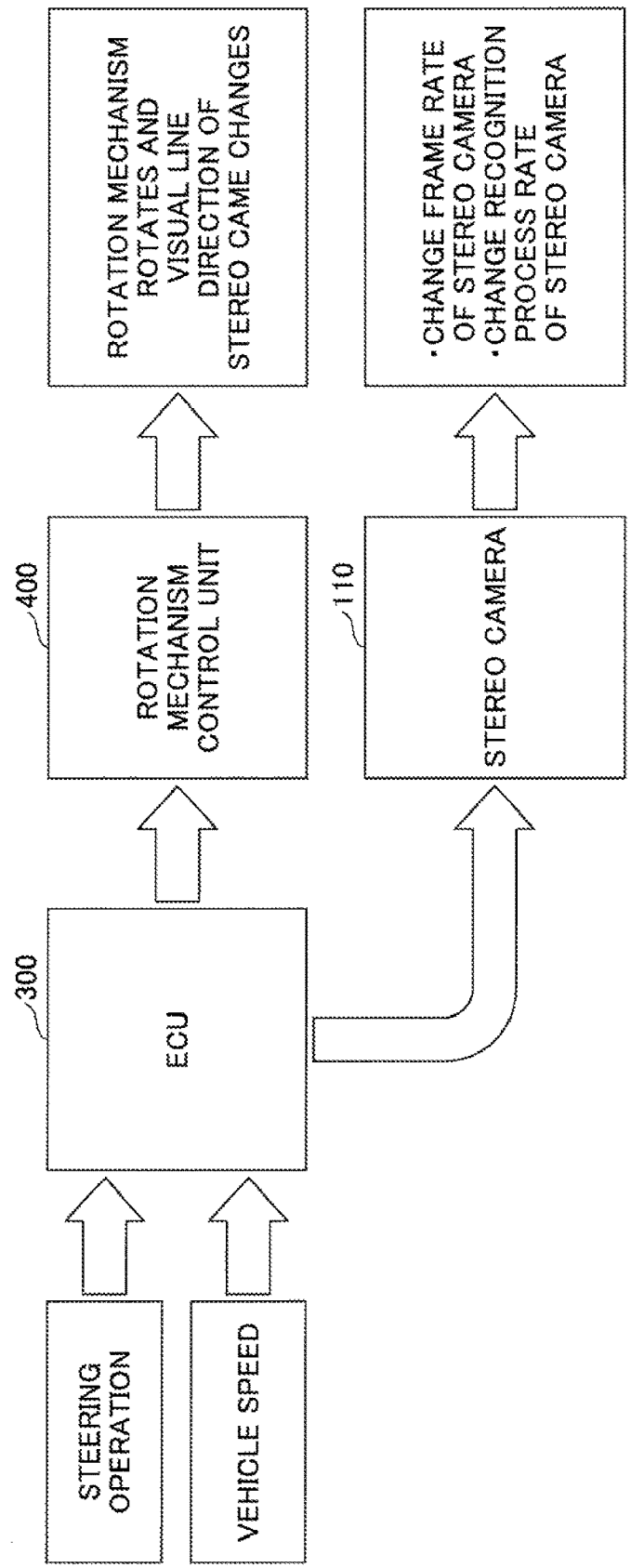
FIG. 14 is a control block diagram of the moving body system according to the second embodiment of the present invention.

FIG. 13 is a block diagram illustrating the hardware configuration of the stereo camera 110 according to the second embodiment of the present invention. FIG. 14 is a control block diagram of the moving body system according to the second embodiment of the present invention.

As shown in FIG. 13, the stereo camera 110 includes a vehicle information interface (I/F) 111.

The vehicle information interface (I/F) 111 is connected to the ECU 300. Thus, the ECU 300 may transmit vehicle information such as information of the steering of the vehicle 500 and information of the vehicle speed to the stereo camera 110 via the vehicle information interface (I/F) 111. The vehicle information interface (I/F) 111 is not limited as long as the interface (I/F) can obtain the vehicle information. The controller area network (CAN) interface (I/F) or the local interconnect network (LIN) interface (I/F) may be used for the vehicle information interface (I/F) 111.

As shown in FIG. 14, the ECU 300 determines the rotation angle of the rotation mechanism 200 with respect to the rotation mechanism control unit 400 based on at least one of the information which indicates the movement direction of the vehicle 500 and the information which indicates the vehicle speed of the vehicle 500. The ECU 300 controls the movement of the rotation mechanism 200 via the rotation mechanism control unit 400. It should be noted that information relating to the steering of the vehicle 500 such as the steering operation angle of the vehicle 500, the steering operation speed of the vehicle 500 and the angle of inclination of the wheel may be used for the information which indicates the movement direction of the vehicle 500.

The ECU 300 transmits at least one of the information which indicates the movement direction of the vehicle 500 and the information of the vehicle speed and changes at least one of the frame rate of the imaging unit of the stereo camera 110 and the recognition process rate of the stereo camera 110. Specifically, it is preferable that the ECU 300 makes at least one of the frame rate and the recognition process rate of the stereo camera 110 higher in a case in which the visual line direction of the stereo camera 110 is changed. In this way, a time difference between image frames which affect the recognition process may be shorten (reduced). As a result, with regard to outside areas of a field of view of the driver of the vehicle 500, high density capturing and recognition in terms of time may be executed. In particular, since tracking accuracy of a recognition target captured in an adjacent image frame may be ensured, the recognition accuracy may be improved.

Further, it is preferable that the ECU 300 returns the at least one of the frame rate and the recognition process rate of the stereo camera 110, which have been changed, to its original rate in accordance with an event in which the movement direction of the vehicle 500 is returned to its original state (straight direction) after the visual line direction of the stereo camera 110 has been changed. In this way, electricity consumption in a state in which the movement direction is not changed may be reduced.

As described above, the moving body system according to the second embodiment of the present invention includes the stereo camera 110 attached to the vehicle 500, the rotation mechanism 200 configured to change the visual line direction of the stereo camera 110, and the ECU 300 configured to control the visual direction of the stereo camera 110 in accordance with the changing of the movement direction of the vehicle 500. Thus, the time for obtaining the information of the surrounding area of the vehicle 500 can be reduced.

In particular, in the second embodiment, the ECU 300 changes at least one of the frame rate and the recognition process rate of the stereo camera 110. Thus, recognition accuracy of the person and the object by the stereo camera 110 may be improved.

<Third Embodiment>

In the following, the moving body system according to the third embodiment of the present invention will be described.

The moving body system according to the third embodiment of the present invention differs from the moving body system according to the second embodiment of the present invention in that the ECU 300 controls at least one of the movement of the stereo camera 110 and the movement of the vehicle 500. In the following description of the third embodiment, a description of features of the third embodiment similar to the features of the second embodiment may be omitted as appropriate.

Figure 15:
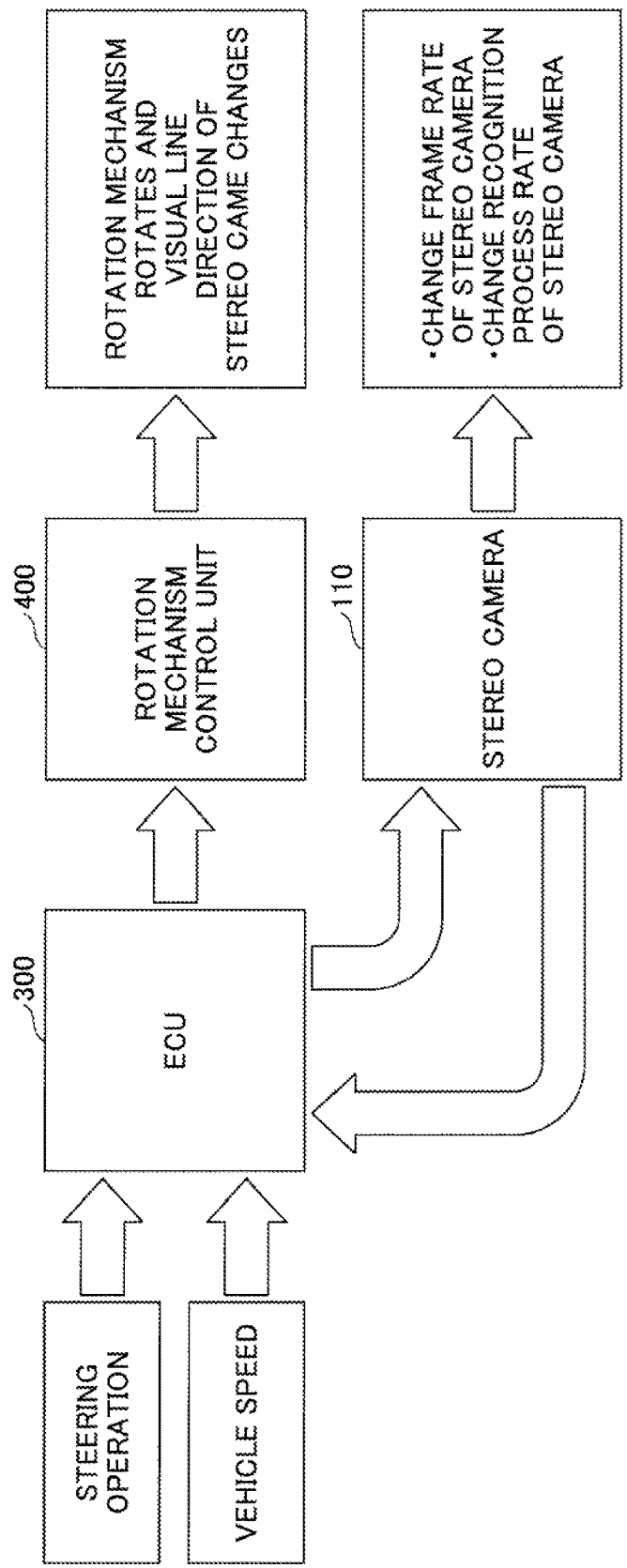
FIG. 15 is a control block diagram of the moving body system according to a third embodiment of the present invention.

FIG. 15 is a control block diagram of the moving body system according to the third embodiment of the present invention.

The ECU 300 changes the frame rate of the stereo camera 110 based on parallax information obtained by the stereo camera 110. Specifically, it is preferable that the ECU 300 controls the operation of the stereo camera 110 such that the frame rate of the stereo camera 110 in a case in which an object exists whose parallax image is large is higher than a frame rate of the stereo camera 110 in a case in which the object whose parallax image is large does not exist. In this way, an interval of time for recognizing in a case in which the person or the object exists in a short distance (a predetermined distance) from the vehicle 500 may be shortened, and tracking information of a recognition target captured in an adjacent image frame may be ensured. As a result, the recognition accuracy may be improved.

It should be noted that in a case in which neither the person nor the object exists in the short distance (the predetermined distance) from the vehicle 500, it is not necessary to shorten the interval of time for recognizing. Thus, it is preferable that the frame rate and the recognition rate in the case in which neither the person nor the object exists in the short distance from the vehicle 500 are set same as the frame rate and the recognition rate in a case in which the movement direction of the vehicle 500 is not changed. In this way, electricity consumption in the state in which the movement direction of the vehicle 500 is not changed may be reduced.

Further, it is preferable that the ECU 300 executes vehicle control such as automatic braking by obtaining the recognition result of the person or the object recognized by the stereo camera 110. Thus, a collision between the vehicle 500 and the person or the object may be prevented.

As described above, the moving body system according to the third embodiment of the present invention includes the stereo camera 110 attached to the vehicle 500, the rotation mechanism 200 configured to change the visual line direction of the stereo camera 110, and the ECU 300 configured to control the visual direction of the stereo camera 110 in accordance with the changing of the movement direction of the vehicle 500. Thus, the time for obtaining the information of the surrounding area of the vehicle 500 can be reduced.

In particular, in the third embodiment, the ECU 300 controls the operation of the stereo camera 110 based on the information of the object recognized by the stereo camera 110. Thus, the recognition accuracy of the person and the object by the stereo camera 110 may be improved.

Further, in the third embodiment, the ECU 300 controls the operation of the vehicle 500 based on the information of the object recognized by the stereo camera 110. Thus, the collision between the vehicle 500 and the person or the object may be prevented.

<Principle of Measuring Distance>

Figure 16:
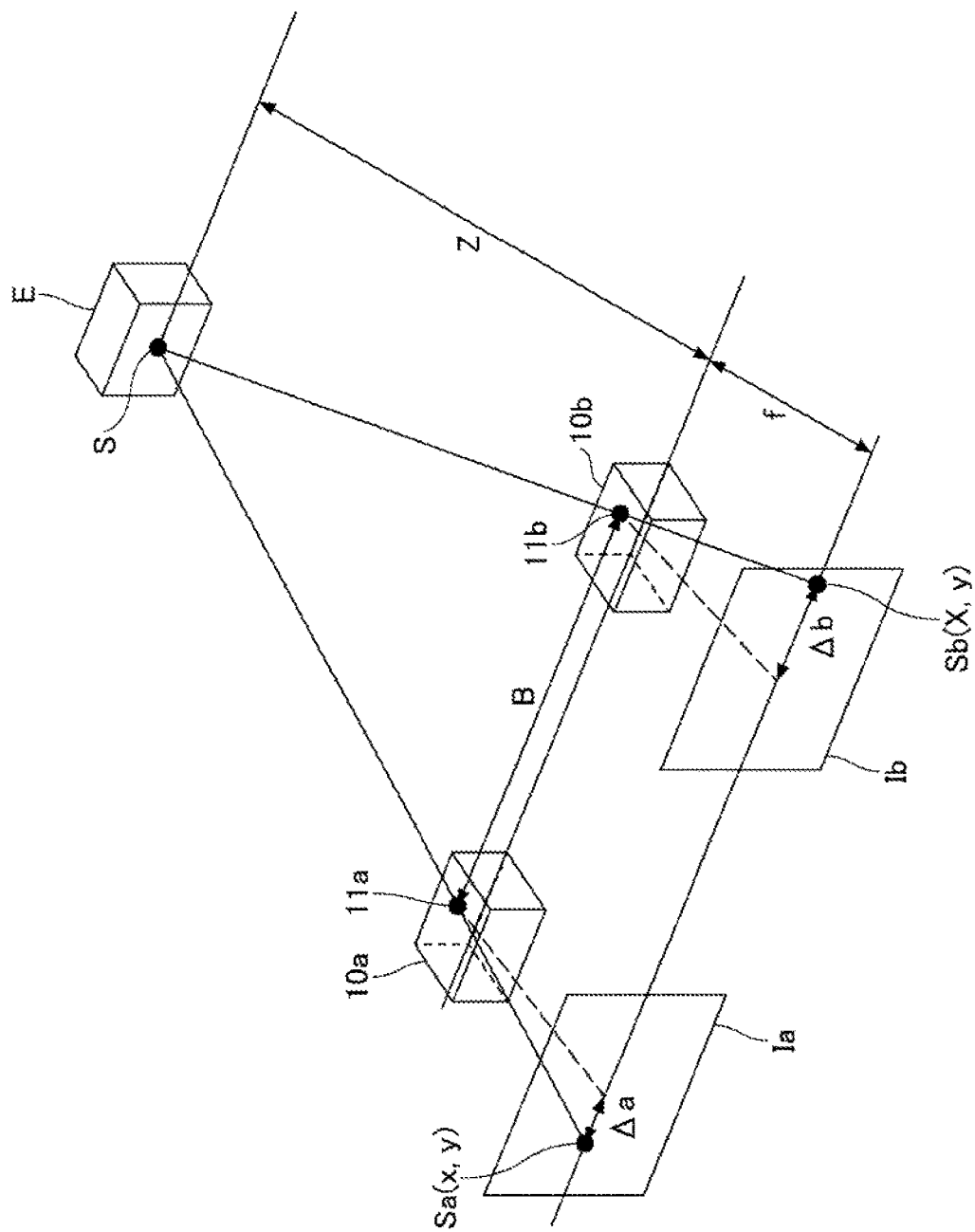
FIG. 16 is a drawing for describing a principle of a measuring distance from the stereo camera to an object.

A principle of measuring distance applied to the embodiment of the present invention will be described. In the following, the principle of measuring distance from the stereo camera to the object, in which parallax (disparity) of the object is derived as a parallax value (disparity value), and the derived parallax value is used to measure the distance from the stereo camera to the object. FIG. 16 is a drawing for describing the principle of deriving the distance from the stereo camera used as the imaging device to the object. In the following description, the process will be described based on each of the units of pixels rather than the units of areas composed of a plurality of pixels for the simplification of description.

(Calculation of Parallax Value)

The images captured by an imaging device 10*a* and an imaging device 10*b* are denoted as a reference image Ia and a comparison image Ib, respectively. In FIG. 16, the imaging device 10*a* and the imaging device 10*b* are installed parallel at the same height. In FIG. 16, a point S on the object E in three-dimensional space is captured at one position of the imaging device 10*a* and also at one position of the imaging device 10*b*, wherein these two positions of the imaging device 10*a* and the imaging device 10*b* are on the same horizontal line.

That is, the point S in each of images is captured at a point Sa(x,y) in the reference image Ia and a point Sb(X,y) in the comparison image Ib. Here, a parallax value Δ(delta) can be expressed by formula (3) described below using the point Sa(x,y) in the coordinates of the imaging device 10*a* and the point Sb(X,y) in the coordinates of the imaging device 10*b*.

$$\Delta = X - x \qquad \text{[FORMULA 3]}$$

Here, as in the case of FIG. 16, the parallax value is expressed by Δ=Δa+Δb, wherein Δa is the distance between the point Sa(x,y) in the reference image Ia and the point of intersection of the normal line extending from the imaging lens 11*a* to the imaging plane, and Δb is the distance between the point Sb(X,y) in the comparison image Ib and the point of intersection of the normal line extending from the imaging lens 11*b* to the imaging plane.

(Calculation of Distance)

The distance Z from the imaging devices 10*a* and 10*b* to the object E can be derived using the parallax value Δ. Specifically, the distance Z is a distance from the plane including the focus position of the imaging lens 11*a* and the focus position of the imaging lens 11*b* to a particular point S on the object E.

As shown in FIG. 16, the distance Z can be calculated by formula (4) described below using the focal length f of the imaging lens 11*a* and the imaging lens 11*b*, the base line length B which is a length between the imaging lens 11*a* and the imaging lens 11*b*, and the parallax value Δ.

$$Z = (B \times f)/\Delta \qquad \text{[FORMULA 4]}$$

From formula 4, the greater the parallax value Δ is, the smaller the distance Z is, and the smaller the parallax value Δ is, the greater the distance Z is.

(Calculation Method of Parallax)

Figure 17:
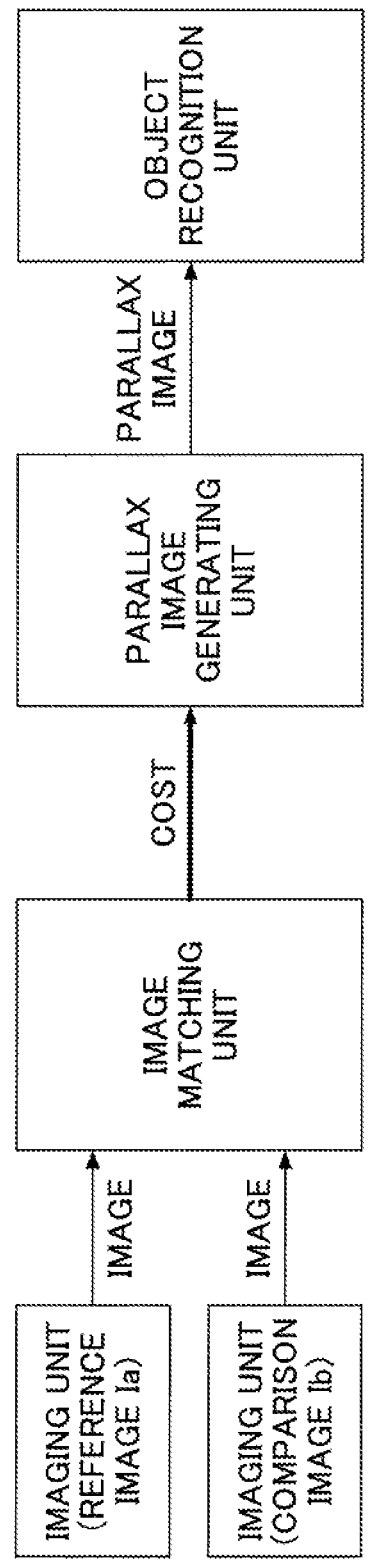
FIG. 17 is a drawing for describing a process for generating a parallax image in the stereo camera.

A calculation method of the parallax will be described with reference to FIG. 17. FIG. 17 is a drawing for describing a process for generating the parallax image in the stereo camera.

As shown in FIG. 17, in the calculation method of the parallax, using the reference image Ia and the comparison image Ib, an image matching unit calculates costs (cost value) which are degrees of dissimilarity for every parallax and calculates parallax of a position at which the degree of dissimilarity is low. The calculation method of the parallax is a method which may derive a parallax image which indicates parallax values for every pixel generated by the parallax image generating unit eventually. It should be noted that the generated parallax image is used for recognizing the person or the object by an object recognition unit. The object recognition unit is provided on a latter part (downstream) of the parallax image generating unit with the luminance image.

(Calculation of Cost)

A method of calculating the cost C(p,d) will be described with reference to FIGS. 18A and 18B and FIG. 19.

Figure 18A:
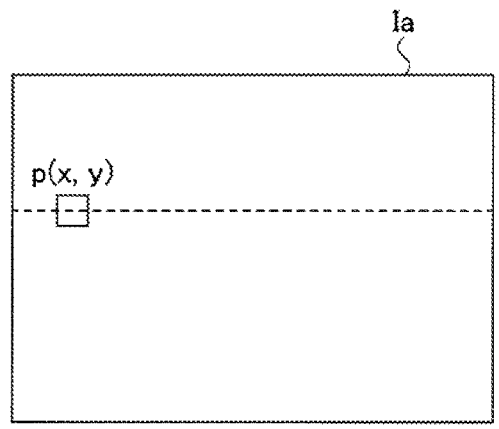
FIGS. 18A and 18B are drawings for describing image matching by a parallax search.
Figure 18B:
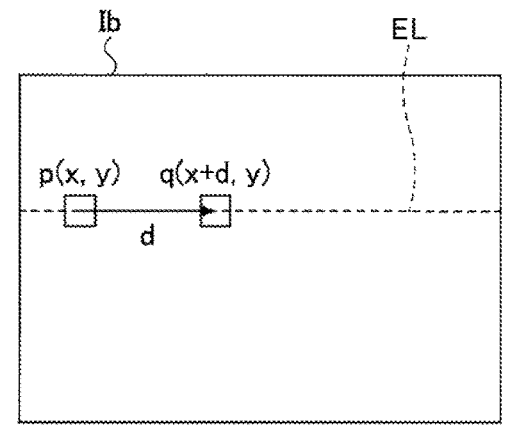

FIGS. 18A and 18B are drawings for describing image matching by a parallax search. Specifically, FIG. 18A is a conceptual diagram illustrating a reference pixel in the reference image Ia. FIG. 18B is a conceptual diagram for describing calculating of a shift amount (deviation amount) while successively shifting candidates for the corresponding pixels in the comparison image Ib relative to the reference pixel shown in FIG. 18A. Here, the corresponding pixel is a pixel in the comparison image Ib which is the most similar to the reference pixel in the reference image Ia.

Figure 19:
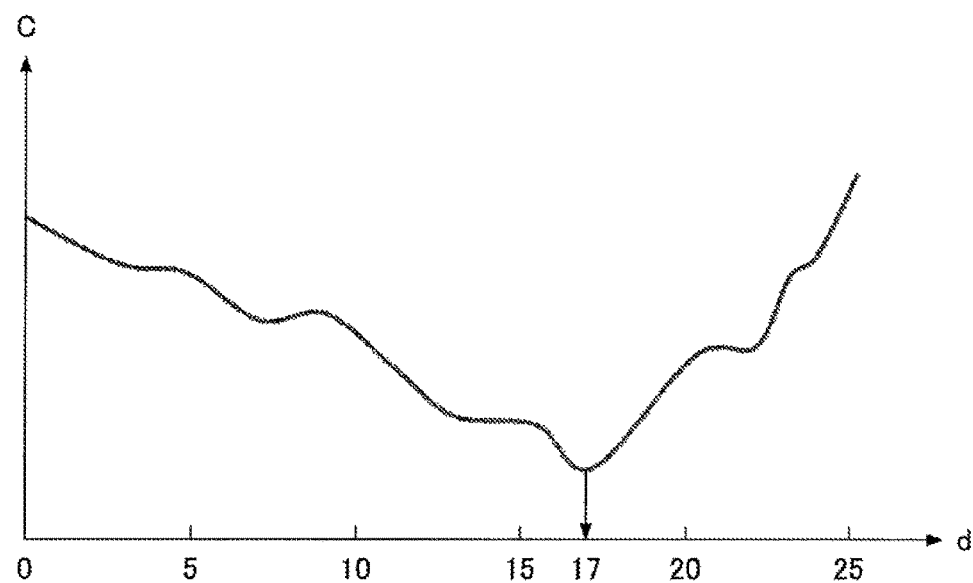
FIG. 19 is a graph of a cost profile plotting costs with respect to shift amounts.

FIG. 19 is a graph of a cost profile plotting costs with respect to shift amounts. In FIG. 19, the abscissa indicates the shift amount d and the ordinate indicates the cost C.

As shown in FIG. 18B, the cost C(p,d) of each of the candidates corresponding to pixels q(x+d,y) with respect to the reference pixel p(x,y) is calculated based on the luminance value of the reference pixel p(x,y) in the reference image Ia and the luminance value of a plurality of candidate corresponding pixels q(x+d,y), on the epipolar line EL in the comparison image Ib with respect to the reference pixel p(x,y). In this description, "d" is a shift amount (deviation amount) of the candidate q of the corresponding pixel from the reference pixel p, and the shift amount is expressed in units of pixels.

That is, in FIGS. 18A and 18B, the cost C(p,d), which is dissimilarity of luminance value between the candidate q(x+d,y) of the corresponding pixels and the reference pixel p(x,y), is calculated while successively shifting the candidate q(x+d,y) of the corresponding pixels one pixel by one pixel in a predetermined range (for example, 0<d<25).

As shown in FIG. 19, the cost(p,d) can be expressed as a graph plotting the cost C(p,d) with respect to the shift amount d. In FIG. 19, since the cost C becomes the minimum value at the shift amount d=17, the parallax value is determined as 17.

EXAMPLES

In the following, specific examples of the present invention will be described. However, the present invention is not limited to this.

Example 1

In the moving body system according to an example 1, the rotation mechanism 200 for changing the visual line direction of the stereo camera 100 was attached on a hood (bonnet) of the vehicle 500 and the stereo camera 100 was attached on the rotation mechanism 200. The rotation mechanism 200 is configured to be controlled based on the information of the steering of the vehicle 500 using the CAN. Simulation was performed by an actual car on the assumption that a person is crossing a road from the left side while the vehicle 500 is turning to the left in a state in which a distance between the person and the vehicle 500 is 10 meter. As a result, according to the example 1, since the stereo camera 100 could capture and recognize the person which did not enter into the field of view of the driver, the vehicle 500 which received the information braked automatically and the collision between the person and the vehicle 500 could be prevented.

Comparative Example 1

In a comparative example 1, the moving system similar to the example 1 was used and simulation was performed by the actual car, which is similar to the car of the example 1, in a state in which the rotation mechanism 200 is turned off and the visual line direction of the stereo camera 100 could not move (secured to the movement direction of the vehicle 500). As a result, the comparative example 1 could not notify the vehicle 500 of the existence of the person.

Example 2

In an example 2, the moving system similar to the example 1 was used and simulation was performed by the actual car, which is similar to the car of example 1, on the assumption that another vehicle is crossing the road from the left side while the vehicle 500 is turning to the left in a state in which a distance between the other vehicle and the vehicle 500 is 20 meter. As a result, according to the example 2, since the stereo camera 100 could capture and recognize the other vehicle which did not enter into the field of view of the driver, the vehicle 500 which received the information braked automatically and the collision between the person and the vehicle 500 could be prevented.

Comparative Example 2

In a comparative example 2, the moving system similar to the example 2 was used and simulation was performed by the actual car, which is similar to the car of example 2, in a state in which the rotation mechanism 200 is turned off and the visual line direction of the stereo camera 100 could not move (secured to the movement direction of the vehicle 500). As a result, the comparative example 2 could not notify the vehicle 500 of the existence of the other vehicle.

Example 3

In the moving body system according to an example 3, the rotation mechanism 200 for changing the visual line direction of the stereo camera 100 was attached on a roof of the vehicle 500 and the stereo camera 100 was attached on the rotation mechanism 200. The rotation mechanism 200 is configured to be controlled based on the information of the angle of inclination of the wheel of the vehicle 500 using the CAN. Simulation was performed by an actual car on the assumption that a person is crossing a road from the left side while the vehicle 500 is turning to the left in a state in which a distance between the person and the vehicle 500 is 10 meter. As a result, according to the example 3, since the stereo camera 100 could capture and recognize the person which did not enter into the field of view of the driver, the vehicle 500 which received the information braked automatically and the collision between the person and the vehicle 500 could be prevented.

Comparative Example 3

In a comparative example 3, the moving system similar to the example 3 was used and simulation was performed by the actual car, which is similar to the car of example 3, in a state in which the rotation mechanism 200 is turned off and the visual line direction of the stereo camera 100 could not move (secured to the movement direction of the vehicle 500). As a result, the comparative example 3 could not notify the vehicle 500 of the existence of the person.

Example 4

In an example 4, the moving system similar to the example 3 was used and simulation was performed by the actual car, which is similar to the car of example 3, on the assumption that another vehicle is crossing the road from the left side while the vehicle 500 is turning to the left in a state in which a distance between the other vehicle and the vehicle 500 is 20 meter. As a result, according to the example 4, since the stereo camera 100 could capture and recognize the other vehicle which did not enter into the field of view of the driver, the vehicle 500 which received the information braked automatically and the collision between the person and the vehicle 500 could be prevented.

Comparative Example 4

In a comparative example 4, the moving system similar to the example 4 was used and simulation was performed by the actual car, which is similar to the car of example 4, in a state in which the rotation mechanism 200 is turned off and the visual line direction of the stereo camera 100 could not move (secured to the movement direction of the vehicle 500). As a result, the comparative example 4 could not notify the vehicle 500 of the existence of the other vehicle.

Example 5

An example 5, since the stereo camera 100 obtained a parallax of the person where the distance between the stereo camera 100 and the person was 10 meter, made the frame rate of the stereo camera 100 higher. As a result, according to the example 5, since the stereo camera 100 could capture and recognize the person which did not enter into the field of view of the driver, the vehicle 500 which received the information braked automatically and the collision between the person and the vehicle 500 could be prevented in good time.

Although the moving body system of the embodiments is described above, the present invention is not limited to these embodiments, but various variations and modifications may be made without departing from the scope of the present invention.

Further, although the vehicle 500 is described as an example of the moving body of the moving body system according to the embodiments, the present invention is not limited to this. As for the moving body, a flight body such as a helicopter and an airplane which is operated by a control stick, or an unmanned flight body remotely operated by a radio control device may be used. Further, a boat or a ship may be used for the moving body.

In a case in which the flight body which is operated by the control stick is used for the moving body, it is preferable that the control unit of the moving body system controls the visual line direction of the imaging device based on a changing of a control signal of the control stick.

In a case in which the flight body which is remotely operated by the radio control device is used for the moving body, it is preferable that the control unit of the moving body system controls the visual line direction of the imaging device based on at least one of a control signal of the radio control unit and image information captured by the imaging device. In the case in which the visual line direction of the imaging device is controlled based on the image information captured by the imaging device, an obstacle may be recognized based on the image information and the moving body may be controlled in order to avoid the obstacle, for example. Thus, when the moving signal which indicates a direction for avoiding the obstacle is calculated (detected), the visual line direction of the imaging device may be controlled based on the moving signal. It should be noted that although the configuration in which the visual line direction of the imaging device is controlled based on the image information is preferable for the flight body, it may be applied for the vehicle or the like.

It should be noted that in the case in which the flight body is used for the moving body, the control of the visual line direction of the imaging device may be performed not only in a horizontal direction (left/right direction) but also in a vertical direction (upper/lower direction).

Further, a monocular camera may be used instead of the stereo camera. In a case in which the monocular camera is used, distance information may be obtained by a laser radar unit or the like. However, when the person or the object is recognized based on the obtained distance information, using the laser radar unit sometimes makes it difficult to ensure spatial resolution power and recognition accuracy adequately. Accordingly, in a system such as the above described moving system, which obtains not only information of a front of the vehicle but also information of the surrounding area of the vehicle, the stereo camera which has higher spatial resolution power may be used preferably.

The present application is based on and claims the benefit of priority of Japanese Priority Application No. 2015-003482 filed on Jan. 9, 2015 and Japanese Priority Application No. 2015-227268 filed on Nov. 20, 2015 with the Japanese Patent Office, the entire contents of which are hereby incorporated by reference.

What is claimed is:

1. A moving body system comprising:
    an imaging device attachable to a moving body including at least one wheel and a steering device which is attached to the moving body and is operated to control a movement direction of the moving body in accordance with steering operation of the steering device;
    a visual line direction changing mechanism configured to change a visual line direction of the imaging device; and
    a control unit configured to determine at least one steering operation information selected from a group consisting of a steering operation angle of the steering device attached to the moving body, a steering operation speed of the steering device attached to the moving body, and an angle of inclination of the wheel of the moving body, and detect, based on said at least one steering operation information determined by the control unit, changing of the movement direction of the moving body, and change the visual line direction of the imaging device in accordance with the changing of the movement direction of the moving body, detected based on said at least one steering operation information.

2. The moving body system as claimed in claim 1, wherein the control unit is configured to control the visual line direction of the imaging device such that an angle made by the visual line direction of the imaging device and the movement direction of the moving body is changed in accordance with a changing amount of the movement direction of the moving body.

3. The moving body system as claimed in claim 1, wherein the control unit is configured to control the visual line direction of the imaging device such that the larger a changing amount of the movement direction of the moving body becomes, the larger an angle made by the visual line direction of the imaging device and the movement direction of the moving body becomes.

4. The moving body system as claimed in claim 1, wherein the moving body is a vehicle.

5. The moving body system as claimed in claim 4, wherein the control unit is configured to control the visual line direction of the imaging device such that the visual line direction of the imaging device is angled with respect to the movement direction of the vehicle inside of a turning direction of the vehicle.

6. The moving body system as claimed in claim 4, wherein the control unit is configured to detect a changing amount of the movement direction of the moving body based on at least one of a steering operation angle of the vehicle, an angle of inclination of a wheel of the vehicle, and a changing of images captured by the imaging device.

7. The moving body system as claimed in claim 1, wherein the control unit is configured to change at least one of a frame rate of the imaging device and a recognition process rate of the imaging device in accordance with the changing of the movement direction of the moving body.

8. The moving body system as claimed in claim 7, wherein the control unit is configured to make at least one of the frame rate of the imaging device and the recognition process rate of the imaging device higher in accordance with the changing of the movement direction of the moving body.

9. The moving body system as claimed in claim 7, wherein the control unit is configured to return the at least one of the frame rate of the imaging device and the recognition process rate of the imaging device which is changed to its original rate in accordance with an event in which the movement direction of the moving body returns to a straight direction after the visual line direction of the imaging device has been changed.

10. The moving body system as claimed in claim 7, wherein the control unit is configured to make the frame rate of the imaging device higher in a case in which an object exists in a predetermined distance from the moving body than the frame rate of the imaging device in a case in which the object does not exist in the predetermined distance from the moving body.

11. The moving body system as claimed in claim 1, wherein the imaging device is a stereo camera.

12. A moving body system comprising:
an imaging device attachable to a moving body including at least one wheel and a steering device which is attached to the moving body and is operated to control a movement direction of the moving body in accordance with steering operation of the steering device, the imaging device having been configured to capture a predetermined area with respect to, and external to, the moving body;
a predetermined area changing mechanism configured to move the imaging device with respect to the moving body in order to change the predetermined area with respect to the moving body in a state in which the imaging device is attached to the moving body; and
a control unit configured to determine at least one steering operation information selected from a group consisting of a steering operation angle of the steering device attached to the moving body, a steering operation speed of the steering device attached to the moving body, and an angle of inclination of the wheel of the moving body, and detect, based on said at least one steering operation information determined by the control unit, changing of the movement direction of the moving body, and control the predetermined area changing mechanism in order to change the predetermined area with respect to the moving body in accordance with the changing of the movement direction of the moving body, detected based on said at least one steering operation information.

13. The moving body system as claimed in claim 12, wherein the control unit is configured to control the predetermined area changing mechanism in order to change the predetermined area with respect to the moving body in accordance with an operation of a movement direction changing mechanism which is configured to change the movement direction of the moving body.

14. The moving body system as claimed in claim 12, wherein in accordance with changing of the movement direction of the moving body by a first angle to one side, the control unit is configured to control the predetermined area changing mechanism in order to change the predetermined area with respect to the moving body by a second angle to the one side, the second angle being larger than the first angle.

15. The moving body system as claimed in claim 14, wherein in a case in which a changing angle of the movement direction of the moving body is less than the first angle, the control unit is configured to control the predetermined area changing mechanism in order not to change the predetermined area with respect to the moving body.

16. The moving body system as claimed in claim 14, wherein when the control unit determines the distance between the moving body and the object in the changed predetermined area to be less than a predetermined distance, the control unit performs at least one of: (i) outputs warning information; and (ii) automatically brings the moving body to a stop.

17. A moving body system comprising:
an imaging device attachable to a moving body including at least one wheel and a steering device which is attached to the moving body and is operated to control a movement direction of the moving body in accordance with steering operation of the steering device, the imaging device having been configured to capture a predetermined area with respect to, and external to, the moving body and determine a distance between the moving body and an object in the predetermined area;
a predetermined area changing mechanism configured to move the imaging device with respect to the moving body in order to change the predetermined area with respect to the moving body in a state in which the imaging device is attached to the moving body; and
a control unit configured to determine at least one steering operation information selected from a group consisting of a steering operation angle of the steering device attached to the moving body, a steering operation speed of the steering device attached to the moving body, and an angle of inclination of the wheel of the moving body, and detect, based on said at least one steering operation information determined by the control unit, changing of the movement direction of the moving body, and control the predetermined area changing mechanism in order to change the predetermined area with respect to the moving body in accordance with the changing of the movement direction of the moving body, detected based on said at least one steering operation information, the imaging device capturing the changed predetermined area and the control unit determining a distance between the moving body and an object in the changed predetermined area.

18. The moving body system as claimed in claim 17, wherein the moving body is a flight body.

19. The moving body system as claimed in claim 18, wherein the flight body is configured to be operated by a control stick, and
wherein the control unit is configured to detect the changing of the movement direction of the flight body based on a changing of a control signal of the control stick in order to control the visual line direction of the imaging device.

20. The moving body system as claimed in claim 18, wherein the flight body is configured to be remotely operated by a radio control device, and
wherein the control unit is configured to control the visual line direction of the imaging device based on at least one of a control signal of the radio control unit and image information captured by the imaging device.

* * * * *